(12) United States Patent
Graham et al.

(10) Patent No.: US 6,318,576 B1
(45) Date of Patent: Nov. 20, 2001

(54) SANITARY RUPTURE DISK APPARATUS

(75) Inventors: James R. Graham, Tulsa; Tom P. Miller, Broken Arrow, both of OK (US)

(73) Assignee: Oklahoma Safety Equipment Co., Inc., Broken Arrow, OK (US)

( * ) Notice: Subject to any disclaimer, the term of this patent is extended or adjusted under 35 U.S.C. 154(b) by 0 days.

(21) Appl. No.: 09/718,315

(22) Filed: Nov. 21, 2000

(51) Int. Cl.⁷ .................................................. F16K 13/00
(52) U.S. Cl. ............................................................ 220/89.2
(58) Field of Search ............................ 220/89.1, 89.2; 137/68.19, 68.21, 68.25, 68.26, 68.27

(56) References Cited

U.S. PATENT DOCUMENTS

| | | | |
|---|---|---|---|
| 2,224,748 | * 12/1940 | Sauer | 220/89.2 |
| 2,922,544 | * 1/1960 | Hibbard et al. | 220/89.2 |
| 4,067,154 | 1/1978 | Fike, Jr. | 52/99 |
| 4,207,913 | * 6/1980 | Fike, Jr. | 220/89.2 |
| 4,612,739 | 9/1986 | Wilson | 52/1 |
| 4,656,793 | 4/1987 | Fons | 52/98 |
| 4,750,303 | 6/1988 | Mullen | 52/98 |
| 4,777,974 | * 10/1988 | Swift et al. | 220/89.2 |
| 4,787,180 | 11/1988 | Robinson et al. | 52/1 |
| 4,821,909 | 4/1989 | Hibler et al. | 220/207 |
| 5,036,632 | 8/1991 | Short, III et al. | 52/1 |
| 6,070,365 | 6/2000 | Leonard | 52/1 |
| 6,241,113 | * 6/2001 | Mozley et al. | 220/89.2 |

* cited by examiner

*Primary Examiner*—Joseph M. Moy
(74) *Attorney, Agent, or Firm*—Garvey, Smith, Nehrbass & Doody, LLC

(57) ABSTRACT

A sanitary rupture disk apparatus includes a rupture disk member having a periphery and a stitched portion, preferably positioned next to the periphery. A hinge area that is unstitched is provided also at the periphery of the rupture disk member. A peripheral holder or support engages the periphery of the disk member, the peripheral support being comprised of a pair of backup rings and a flexible, preferably polymeric member. The polymeric member can be in the form of a two-part flexible sanitary gasket. A pair of annular flanges of the flexible gasket extend radially inwardly of the peripheral support, each of the flanges overlapping and sealing the stitched portion of the disk member, the flanges enabling a pressure loading of the disk member.

10 Claims, 4 Drawing Sheets

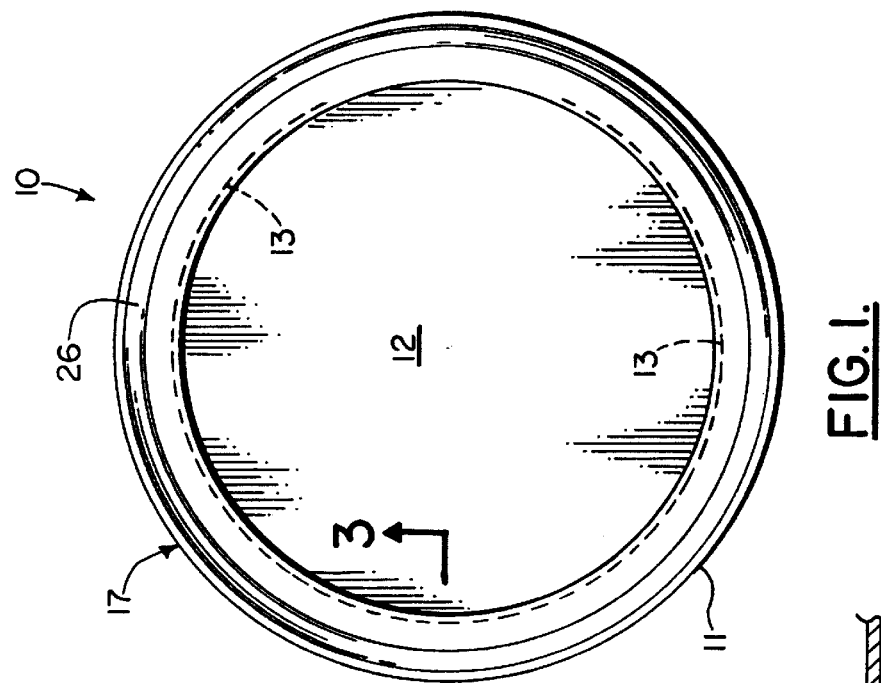
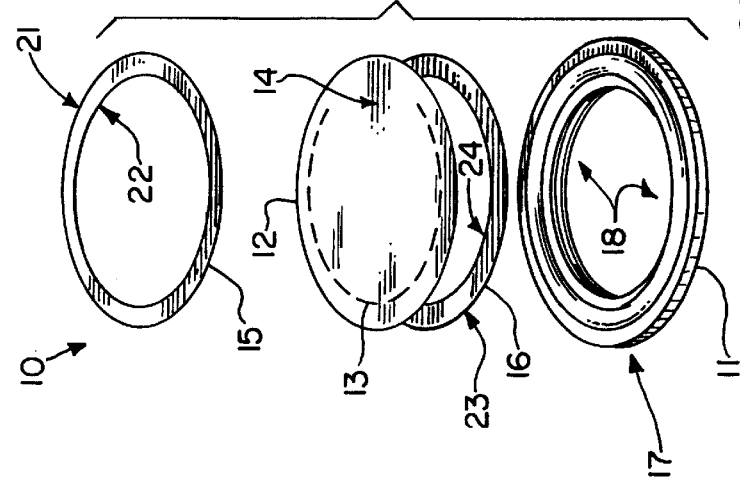
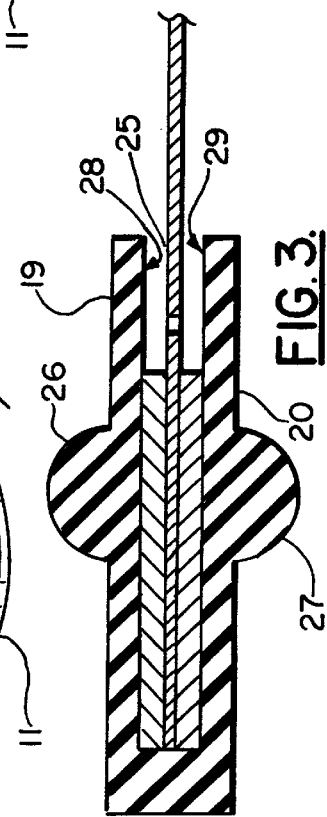

SANITARY RUPTURE DISK APPARATUS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to rupture disks, and more particularly to an improved rupture disk apparatus. Even more particularly, the present invention relates to an improved rupture disk apparatus that features a unique sealing design that does not require a sealing membrane for pressure loading of a central metal membrane. The present invention even more particularly relates to an improved rupture disk construction that utilizes a two piece sanitary gasket/holder having an overlap feature for the circumferential stitches of the central metal membrane to provide both the seal and additional structural support at the weakest spot of the pressure containing metal membrane.

2. General Background of the Invention

Patents have issued that purport to be sanitary or hygienic pressure relief panels or disks. As an example, U.S. Pat. No. 4,821,909 discloses a hygienic pressure relief panel unit which is said to reliably rupture at a predetermined pressure in order to prevent buildup of dangerous pressure within protected structure such as a vessel or the like defining an enclosed space, which prevents media passage there through before rupture, and which is supposed to present a sanitary, easily cleanable surface toward the vessel interior in order to inhibit accumulation of food particles, dust or the like. The preferred panel unit includes a slotted stainless steel panel with the slots configured as a line of weakness for separation at a predetermined pressure, a sheet of PTFE material prepared on one side thereof to present an adhesive bonding surface, and an adhesive coupling the sheet and the panel, whereby the panel unit can be placed in a covering relationship with the vent opening of the protected structured in order to present the outer face of the PTFE sheet toward the vessel interior. The panel can include a series of slotted apertures defined there through configured to present a line of weakness defining three sides of a rectangle. The line of weakness defines the predetermined amount of pressure at which the panel ruptures.

BRIEF SUMMARY OF THE INVENTION

The present invention provides an improved rupture disk apparatus in the form of a sanitary rupture disk apparatus. The apparatus includes a rupture disk member having a stitched portion, a periphery and a hinge area.

A peripheral support engages the periphery of the disk member, the peripheral support being a flexible member.

A pair of annular flanges extend radially inwardly of the peripheral support, each of the flanges overlapping and sealing the stitched portion of the disk member during use, the flanges being configured to enable a pressure loading of the disk member.

The peripheral support can include flexible polymeric members and a pair of spaced apart backup rings.

The peripheral support can be of a rubber or polymeric material.

The stitched portion preferably extends circumferentially at least 270 degrees about the periphery of the rupture disk member.

The peripheral support can include a pair of separate support members.

The rupture disk member can be generally circular in shape. The rupture disk member has a center and the stitched portion is closer to the disk periphery than to the disk center.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a top view showing the preferred embodiment of the apparatus of the present invention;

FIG. 2 is an exploded, perspective view showing the preferred embodiment of the apparatus of the present invention;

FIG. 3 is a sectional view taken along lines 3—3 of FIG. 1;

DETAILED DESCRIPTION OF THE INVENTION

Figure 4:
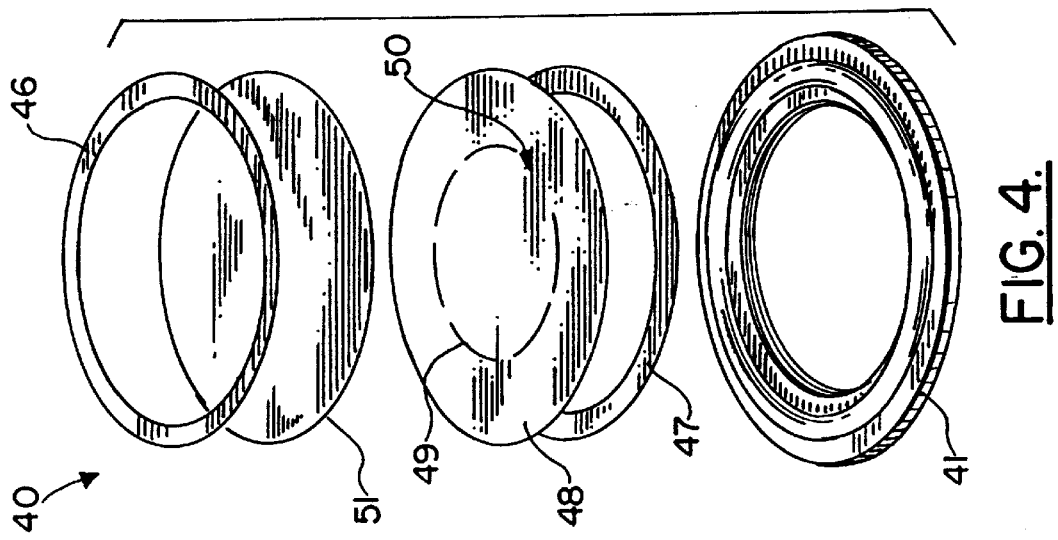
FIG. 4 is a perspective view showing a prior art sanitary disk with seal member that loads the disk.
Figure 5:
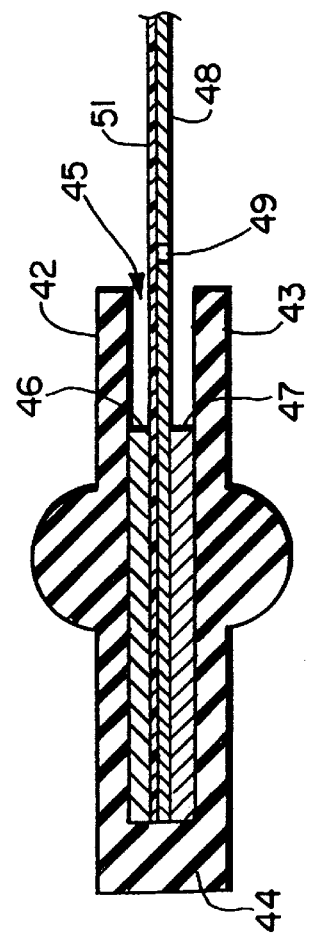
FIG. 5 is a sectional view illustrating the prior art disk of FIG. 4.
Figure 6:
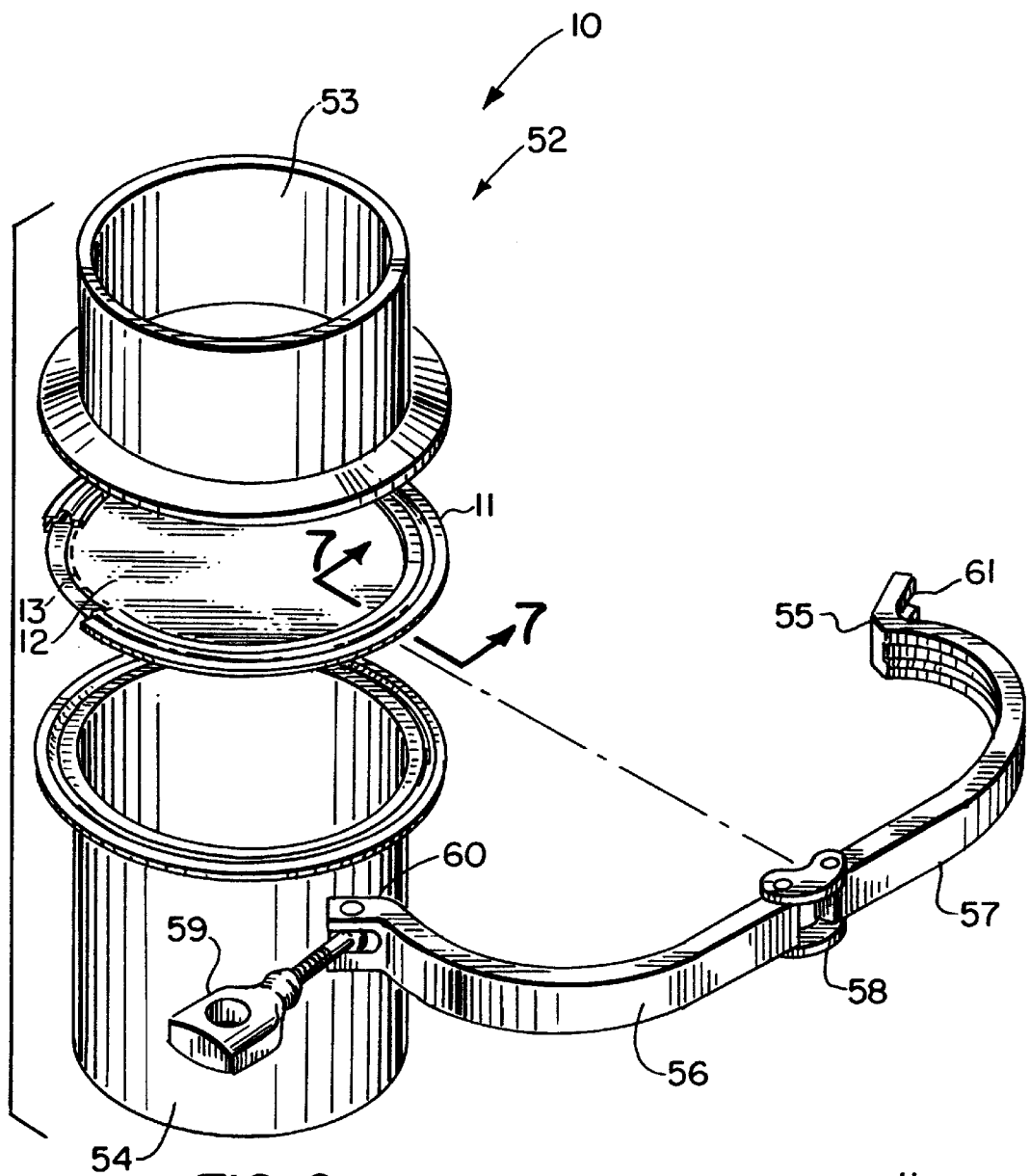
FIG. 6 is a perspective, exploded view of the preferred embodiment of the apparatus of the present invention.

FIGS. 1–3 and 6–9 show the preferred embodiment of the apparatus of the present invention designated generally by the numeral 10. A prior art type sanitary gasket and disk arrangement is shown in FIGS. 4 and 5, designated generally by the numeral 40. In FIG. 4, the prior art rupture disk apparatus 40 provides a sanitary gasket 41 having a pair of spaced apart flanges 42, 5 43 and a peripheral flange 44. A gap 45 between the flanges 42, 43 carries a pair of backup rings including upper backup ring 46 and lower backup ring 47. The backup rings 46, 47 engage and hold a sealing disk 51 (eg. Teflon®) and a disk membrane 48 having a stitched portion 49 and hinge area 50. Such a disk apparatus 40 can be held in a commercially available housing such as the housing 52 shown in FIGS. 6 and 8.

The sealing disk 51 is installed on the pressure side of the disk apparatus 40. Sealing disk 51 seals the disk pressure control membrane 48 and thus provides the loading of the membrane 48 to designated failure point.

FIGS. 1–3 and 6–9 show the preferred embodiment of the apparatus 10 of the present invention which eliminates any need for a sealing disk 51 or like seal member. The apparatus 10 of the present invention shown in FIGS. 1–3 and 6–9 does not have a sealing disk (such as sealing disk 51 in FIGS. 4–5). Sealing is accomplished by the sanitary gasket 11 having periphery 17, central opening 18, and gasket surfaces 28, 29.

In FIGS. 1–3, rupture disk apparatus 10 includes a flexible gasket 11 that can be manufactured of rubber, silicone, Viton, or other suitable sanitary gasket material. This flexible gasket 11 secures a disk membrane 12 between upper and lower flanges 19, 20, as shown in FIGS. 2 and 3. The disk membrane 12 can be circular in shape, having a circular pattern of stitches 13 and a hinge area 14. A pair of backup rings 15, 16 can be placed at the periphery of disk 12 as shown in FIGS. 1–3.

Each backup ring 15, 16 has a central opening defined by an inner annular surface. Each backup ring also has an outer annular surface. Thus, the upper backup ring 15 has outer annular surface 21 and inner annular surface 22. The lower backup ring 16 has outer annular surface 23 and inner annular surface 24.

A gap 25 is shown in FIG. 3 that is generally in between upper and lower flanges 19, 20. The flexible, flat annular surfaces 28, 29 of the sanitary gasket/holder 11, when exposed to system pressure, and when clamped against disk membrane 12 by holder 52 (see FIGS. 6–9) effectively seal the stitches 13 allowing the metal membrane 12 to be loaded by this pressure to its designed failure point. This feature of the present invention thus eliminates the need for a sealing membrane such as of a fluorocarbon material that typically covers these same stitches, as represented by the prior art drawings of FIGS. 4 and 5.

A metallic housing 52 has recesses that receive projecting portions 26, 27 of flexible holder 11. Housing 52 includes upper housing section 43, lower housing section 54 and clamp ring 55. Ring 55 has sections 56, 57 connected together using hinge 58 and wing nut 59 pivotally attached at pivot 60 to ring section 56.

Figure 9:
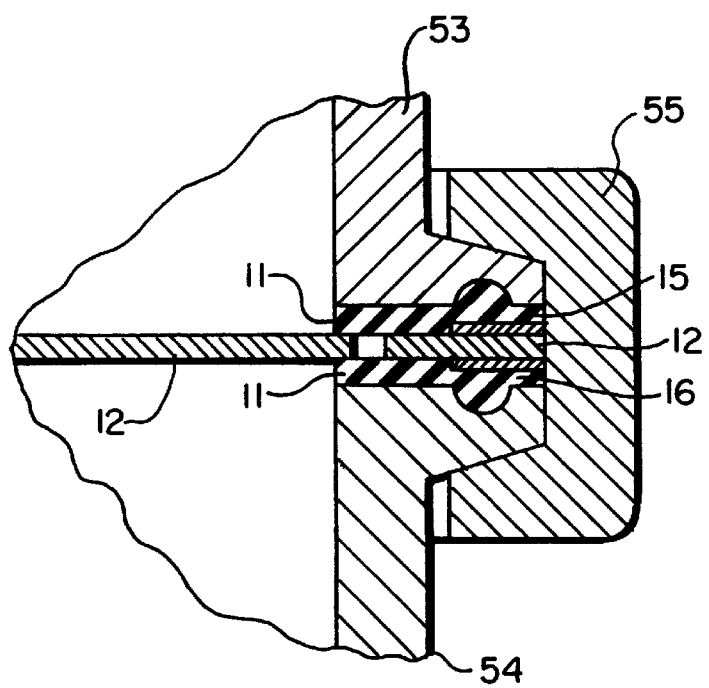
FIG. 9 is a sectional view taken along lines 9—9 of FIG. 8.

Each housing section 53, 54 has an annular flange with a groove that receives an annular projection 26 or 27 of flexible holder 11. Housing section 53 has annular flange 62 with groove 63. Housing section 54 has annular flange 64 with groove 65. Flanges 62, 64 have beveled surfaces that engage correspondingly shaped bevel surfaces of ring 55 as shown in FIG. 9. It should be understood that housing 52 includes upper and lower sections 53, 54 and ring 55 is a prior art, commercially available disk holding device.

Figure 7:
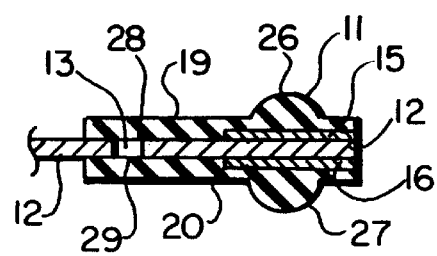
FIG. 7 is a sectional view taken along lines 7—7 of FIG. 6.
Figure 8:
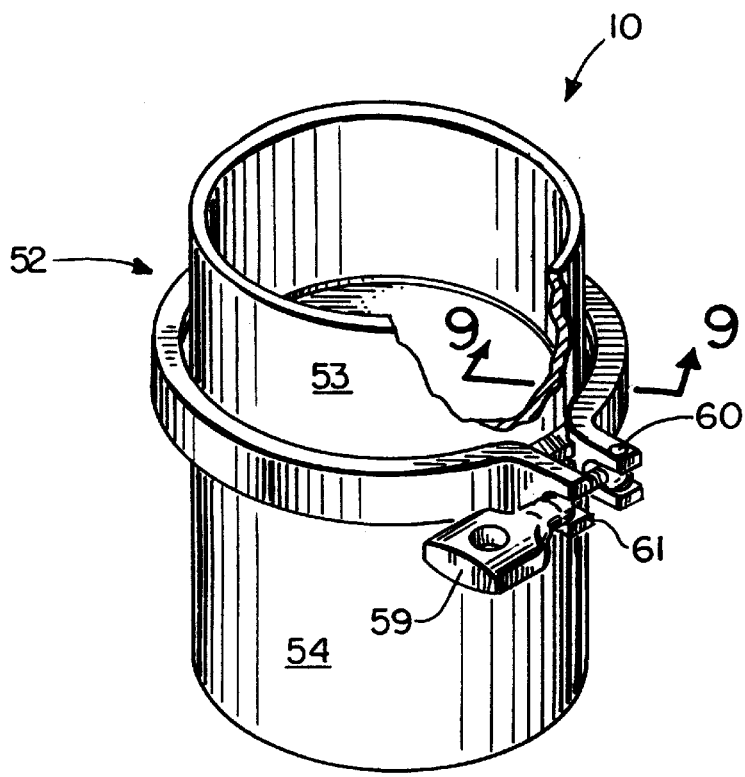
FIG. 8 is a partial perspective view of the preferred embodiment of the apparatus of the present invention.

When wing nut 59 is tightened, flanges 62, 64 compress the assembly of flexible holder 11, backup rings 15, 16 and disk membrane 12, pressing surfaces 28, 29 against disk membrane 12 and sealing gaps between stitches 13 as shown in FIG. 7.

The following is a list of suitable parts and materials for the various elements of the preferred embodiment of the present invention.

| PARTS LIST | |
|---|---|
| PART NUMBER | DESCRIPTION |
| 10 | rupture disk apparatus |
| 11 | flexible gasket |
| 12 | disk membrane |
| 13 | stitches |
| 14 | hinge area |
| 15 | backup ring |
| 16 | backup ring |

| PARTS LIST | |
|---|---|
| PART NUMBER | DESCRIPTION |
| 17 | outer periphery |
| 18 | central opening |
| 19 | upper flange |
| 20 | lower flange |
| 21 | outer annular surface |
| 22 | inner annular surface |
| 23 | outer annular surface |
| 24 | inner annular surface |
| 25 | gap |
| 26 | upper annular projection |
| 27 | lower annular projection |
| 28 | flat surface |
| 29 | flat surface |
| 30 | peripheral flange |
| 40 | rupture disk |
| 41 | gasket |
| 42 | upper flange |
| 43 | lower flange |
| 44 | peripheral flange |
| 45 | gap |
| 46 | backup ring |
| 47 | backup ring |
| 48 | disk membrane |
| 49 | stitched portion |
| 50 | hinge area |
| 51 | sealing disk |
| 52 | housing |
| 53 | upper housing section |
| 54 | lower housing section |
| 55 | clamp ring |
| 56 | ring section |
| 57 | ring section |
| 58 | hinge |
| 59 | wing nut |
| 60 | pivot |
| 61 | bifurcated end |
| 62 | flange |
| 63 | groove |
| 64 | flange |
| 65 | groove |

The foregoing embodiments are presented by way of example only; the scope of the present invention is to be limited only by the following claims.

What is claimed is:

1. A sanitary rupture disk apparatus, comprising:

a) a rupture disk member having a circumferentially extending stitched portion, a periphery and a hinge area;

b) a peripheral support that engages the periphery of the disk member, the peripheral support being a flexible member; and c) a pair of annular flanges extending radially inwardly of the peripheral support, each of the flanges overlapping and sealing the stitched portion of the disk member during use, the flanges enabling a pressure loading of the disk member.

2. The sanitary rupture disk apparatus of claim 1 wherein the peripheral support comprises a flexible, polymeric member and a pair of spaced apart backup rings.

3. The sanitary rupture disk apparatus of claim 1 wherein the peripheral support includes a flexible member that deforms during use, conforming to the disk member to cover the stitched portion.

4. The sanitary rupture disk apparatus of claim 1 wherein the stitched portion extends more than one hundred eighty degrees about the periphery of the rupture disk member.

5. The sanitary rupture disk apparatus of claim 1 wherein the peripheral support includes a pair of support members.

6. The sanitary rupture disk apparatus of claim 1 wherein the rupture disk member is generally circular in shape.

7. The sanitary rupture disk apparatus of claim 1 wherein the rupture disk member has a center and the stitched portion is closer to the disk periphery than the disk center.

8. The sanitary rupture disk apparatus of claim 1 wherein the peripheral support includes a holder that is of a polymeric material.

9. The sanitary rupture disk apparatus of claim 1 wherein the peripheral support includes a flexible member that is of a rubber material.

10. A sanitary rupture disk apparatus, comprising:
a) a rupture disk member having a periphery and stitched portion;
b) a peripheral support engages the periphery of the disk member, the peripheral support being a flexible member;
c) a pair of annular flanges extending radially inwardly of the peripheral support, each of the flanges overlapping and sealing the stitched portion of the disk member during use, the flanges enabling a pressure loading of the disk member.

* * * * *